US009964840B1

(12) United States Patent
Gao

(10) Patent No.: US 9,964,840 B1
(45) Date of Patent: May 8, 2018

(54) MULTIFUNCTIONAL DESK LAMP THAT PROVIDES BOTH FUNCTIONS OF LIGHTING AND IMAGE PROJECTION

(71) Applicant: Wuhai Gao, Shenzhen (CN)

(72) Inventor: Wuhai Gao, Shenzhen (CN)

( * ) Notice: Subject to any disclaimer, the term of this patent is extended or adjusted under 35 U.S.C. 154(b) by 0 days. days.

(21) Appl. No.: 15/297,152

(22) Filed: Oct. 19, 2016

(51) Int. Cl.
| | |
|---|---|
| *G03B 21/20* | (2006.01) |
| *G03B 21/14* | (2006.01) |
| *F21V 33/00* | (2006.01) |
| *F21S 6/00* | (2006.01) |
| *F21V 8/00* | (2006.01) |
| *F21V 5/04* | (2006.01) |
| *F21V 21/32* | (2006.01) |
| *F21S 9/02* | (2006.01) |
| *F21V 23/04* | (2006.01) |
| *G03B 21/00* | (2006.01) |
| *G03B 21/64* | (2006.01) |
| *F21Y 115/10* | (2016.01) |

(52) U.S. Cl.
CPC ............ *G03B 21/145* (2013.01); *F21S 6/003* (2013.01); *F21S 9/02* (2013.01); *F21V 5/04* (2013.01); *F21V 21/32* (2013.01); *F21V 23/04* (2013.01); *F21V 33/0052* (2013.01); *G02B 6/0096* (2013.01); *G03B 21/001* (2013.01); *G03B 21/64* (2013.01); *F21Y 2115/10* (2016.08)

(58) Field of Classification Search
CPC .. G03B 21/20; G03B 21/2093; G03B 21/145; F21S 8/08; F21S 48/125; F21S 48/178; H05B 31/0036
See application file for complete search history.

(56) References Cited

U.S. PATENT DOCUMENTS

| | | | |
|---|---|---|---|
| 2006/0013008 A1* | 1/2006 | Yeung ..................... | F21S 6/003 362/413 |
| 2006/0203212 A1* | 9/2006 | Held ....................... | F21S 6/006 353/119 |
| 2011/0085323 A1* | 4/2011 | Chien ....................... | F21S 9/02 362/183 |
| 2012/0262682 A1* | 10/2012 | Chuang ............... | F21V 33/0048 353/119 |

* cited by examiner

*Primary Examiner* — Sultan Chowdhury
*Assistant Examiner* — Magda Cruz
(74) *Attorney, Agent, or Firm* — Leong C. Lei

(57) ABSTRACT

A multifunctional desk lamp includes a base, a lighting body, and a light support connected to the base and the lighting body. The lighting body has an integral, one-piece structure and includes an illuminator portion for illumination and an image projection portion for projecting images. Through an integral structure design of the image projection portion and the illuminator portion, advantages of compact size and light weight are achieved. In addition to demonstrating a normal function of lighting, an additional function of projecting images is also provided. Through manual rotation of a projection gear, change of projected images can be achieved so as to make the use convenient and easy for users.

8 Claims, 5 Drawing Sheets

MULTIFUNCTIONAL DESK LAMP THAT PROVIDES BOTH FUNCTIONS OF LIGHTING AND IMAGE PROJECTION

(a) TECHNICAL FIELD OF THE INVENTION

The present invention relates generally to the field of lighting, and more particularly to a multifunctional desk lamp.

(b) DESCRIPTION OF THE PRIOR ART

A desk lamp is a commonly used household electrical appliance for lighting and illumination. The desk lamps are generally classified in two categories, namely standing type and clamping type. The functionality of the desk lamp is to provide lighting in a small area for working and studying.

With the progress and advancing of the modern society, the desk lamp arranged in a house has gone far more than being just a desk lamp and the desk lamp is becoming an important piece of household art work. Under the general idea of involving less renovation but more decoration, the functionality of the desk lamp as a household decoration becomes more significantly than ever. A conventional desk lamp simply applies certain minor modifications on the outside appearance thereof for improving and bettering the functionality of decoration, which is far less than a level of application of light shading to enrich or make vivid a living space. Chinese Patent Document No. 104214654A discloses a rotary shade casting night light, which comprises a base, a projection barrel, and a projection lamp. The projection barrel is provided thereon with projection patterns so that with the projection barrel being driven to rotate by an electric machine, an image projected is set in a rotating form. Although solutions of this kind address, at least partly, the above problem, they suffer high consumption of energy and noise induced by the rotation that might affect the rest of the family members. In addition, they provide a single function for serving as a night light and does not function as regular lighting or illumination.

SUMMARY OF THE INVENTION

To address the above technical issues, the present invention provides a multifunctional desk lamp, which provides both functions of lighting and image projection, and also possesses advantages of simplification of structure, adjustability of projected image, and ease of operation.

The technical solution adopted in the present invention is a multifunctional desk lamp that comprises a base, a lighting body, and a light support connected to the base and the lighting body. The lighting body has an integral structure and comprises an illuminator portion for illumination and an image projection portion for projection of images.

In the multifunctional desk lamp according to the present invention, the image projection portion comprises a rotatable projection gear, such that the rotation of the projection gear changes images projected from the image projection portion.

In the multifunctional desk lamp according to the present invention, the image projection portion comprises, in sequence from inside to outside, a light source, a first optical lens for converging light, and a second optical lens for dispersing light, the projection gear being mounted between the first optical lens and the second optical lens.

In the multifunctional desk lamp according to the present invention, the projection gear is formed with a plurality of projection holes in which projection sheets are mounted and an optical path extending from the light source through, in sequence, the first optical lens, the projection holes, and the second optical lens to an outside space is defined so that the rotation of the projection gear moves the projection holes and the projection sheets thereof to alternately into the optical path to achieve change of the images projected from the image projection portion.

In the multifunctional desk lamp according to the present invention, the image projection portion also comprises a first retention member that retains the first optical lens, a second retention member that retains the second optical lens, and a light guide tube for guiding light and supporting the second optical lens.

In the multifunctional desk lamp according to the present invention, the image projection portion further comprises a back cover, and the back cover is connected, via a spring, to the second retention member.

In the multifunctional desk lamp according to the present invention, the lighting body also comprises a main body, and the illuminator portion and the image projection portion are mounted on the main body.

In the multifunctional desk lamp according to the present invention, the main body comprises positioning pegs and the projection gear comprises positioning spots formed therein to operate in combination with the positioning pegs; and the projection gear and the main body are detachable.

In the multifunctional desk lamp according to the present invention, the base comprises a storage battery that functions as a power supply; and the base is provided thereon with a first switch for controlling a lighting mode of the illuminator portion and a second switch for controlling an activation state of the image projection portion.

In the multifunctional desk lamp according to the present invention, the light support comprises a flexible tube that is bendable.

Compared to the prior art, the multifunctional desk lamp according to the present invention adopts an integral structure of an image projection portion and an illuminator portion to provides advantages of compact size and light weight so that in addition to demonstrating a normal function of lighting, an additional function of projecting images is also provided. Through manual rotation of a projection gear, change of projected images can be achieved so as to make the use convenient and easy for users. In addition, the present invention is provided therein with a built in storage battery to provide emergency lighting during failure of power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
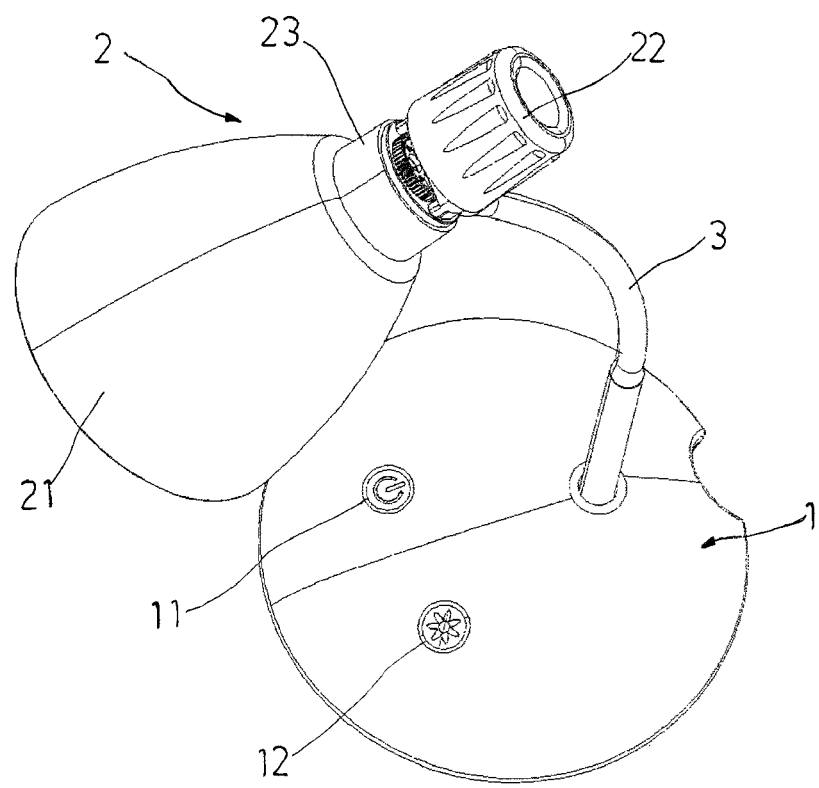
FIG. 1 is a perspective view of the present invention at a viewing angle.

As shown in FIG. 1, an embodiment of the present invention provides a multifunctional desk lamp, which comprises a base 1, a light support 3, and a lighting body 2. The lighting body 2 comprises an illuminator portion 21, an image projection portion 22, and a main body 23. The base 1 can structured as a clamping type configuration, or can be alternatively structured as a planar configuration, and in the instant embodiment, a thin flat configuration is taken for the base 1. Preferably, the base 1 may comprise a repeatedly chargeable or rechargeable storage battery, so that in a condition of no connection with an external power source, the storage battery supplies electrical power to the desk lamp to allow the desk lamp to be positioned without being constrained by the location where a power socket or a wall socket is provided so as to improve flexibility of use of the desk lamp. In addition, the storage battery allows the instant embodiment to serve as an emergency lighting in case of power failure and thus the utilization of the present invention is enhanced. The base 1 is also provided, on a top surface thereof, with a first switch 11 for controlling a lighting mode of the illuminator portion 21 and a second switch 12 for controlling an activation state of the image projection portion 22. The first switch 11 is preferably a touch control switch and controls the illuminator portion 21 to selectively operate in one of three lighting modes of mediate lighting, high lighting, and shut down. The second switch 12 is preferably a touch control switch and controls the image projection portion 22 to selectively operate in two states of lighting on and shutting down. The light support 3 has an end fixedly connected to the base 1 and an opposite end fixedly connected to the lighting body 2 and can be made of a flexible tube that allows for flexing or bending in a generally non-limited manner. In the instant embodiment, a goose neck like tube is taken as the light support 3 and exhibits excellent capability of bearing flexing and good resistance to fatigue. The lighting body 2 is of a one-piece integral structure, where the main body 23 is formed with a previously prepared mold and is preferably made of an acrylic material for fitting with the illuminator portion 21 and the image projection portion 22.

Figure 2:
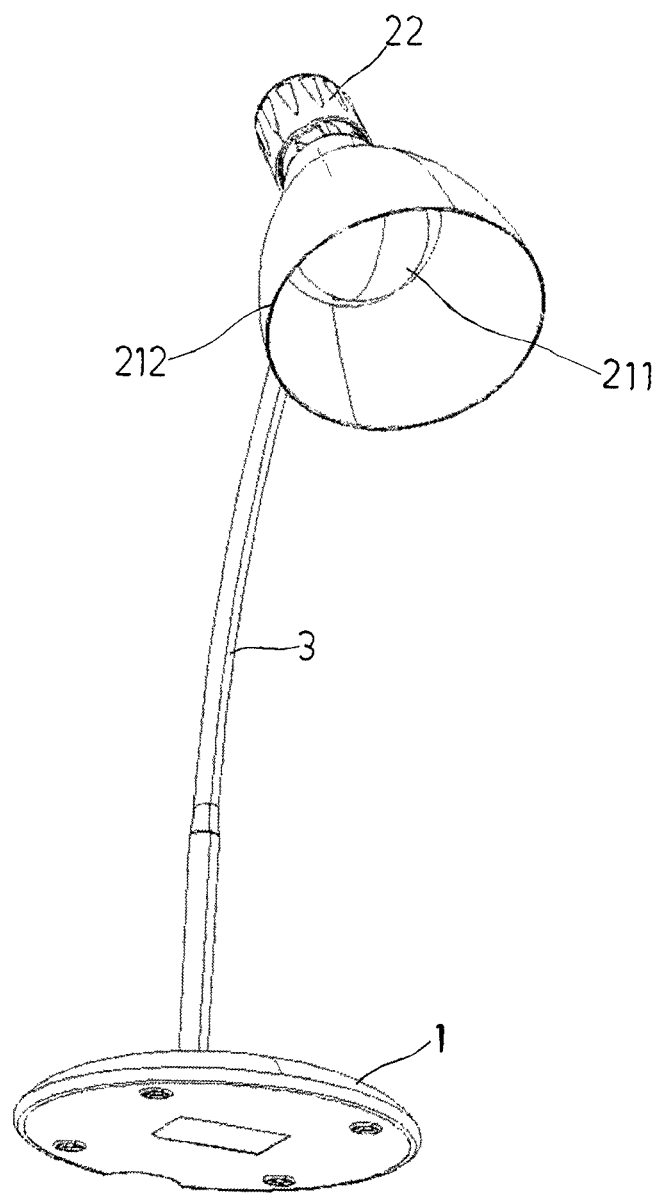
FIG. 2 is a perspective view of the present invention at a different viewing angle.

As shown in FIG. 2, the illuminator portion 21 provides illumination and lighting and comprises a first light source 211 mounted to the main body 23 and a lampshade 212 arranged outside the first light source 211 and preferably integrated with the main body 23. The first light source 211 is preferably formed of SMD (Surface-Mounted Device) LED (Light-Emitting Diode) lights, which exhibits advantages of high brightness, adjustability of lighting angle, energy saving and environmental friendliness, and extended service life. The lampshade 212 is preferably formed of an acrylic material and exhibits advantages of good processability, good weather resistance, and high transparency. The image projection portion 22 functions to project an image to an outside space to provide perception of spatial levels and specific atmosphere and may also function as a night light. The image projection portion 22 is mounted to an end of the main body 23 that is opposite to the illuminator portion 21 so that lighting of the illuminator portion 21 and the image projection portion 22 does not influence each other.

Figure 3:
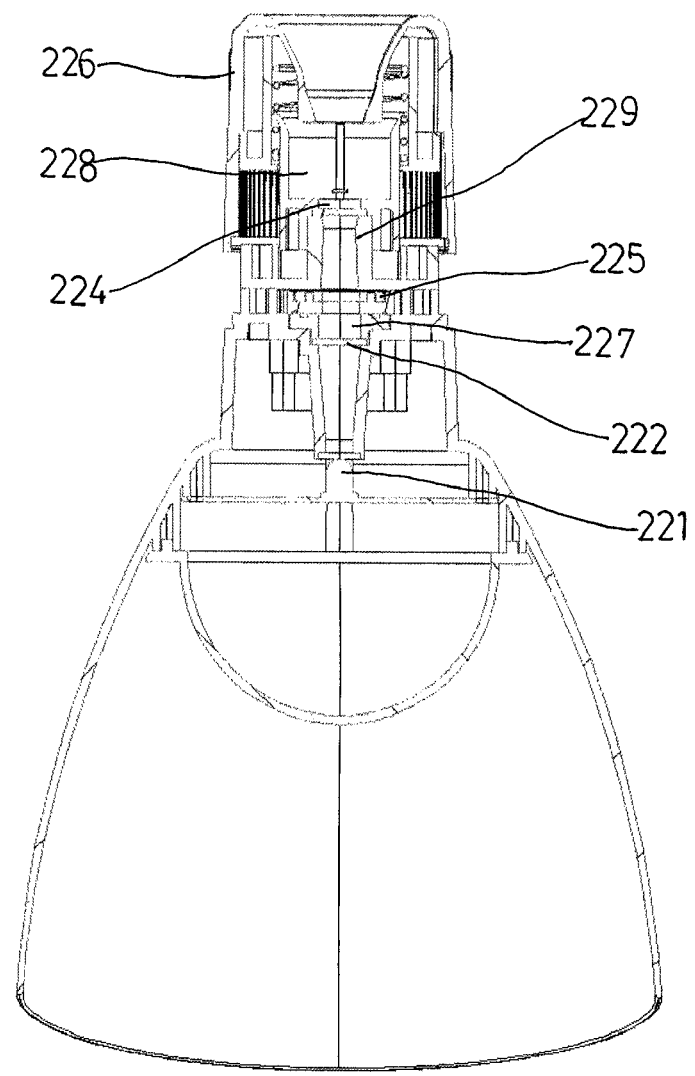
FIG. 3 is a cross-sectional view illustrating a lighting body of the present invention.

Specifically, as shown in FIG. 3, the image projection portion 22 comprises, in sequence from inside to outside, a second light source 221, a first optical lens 222, a first retention member 227, a projection gear 225 having a plurality of projection holes, a light guide tube 229, a second optical lens 224 and a second retention member 228, and a back cover 226. Light emitting from the second light source 221 passes through, in sequence, the first optical lens 222, the first retention member 227, the projection holes, the light guide tube 229, the second optical lens 224, the second retention member 228, and the back cover 226 to reach the outside so as to define an optical path, which is the path along which an image projected from the image projection portion 22. The second light source 221 is arranged in an interior of the main body 23. The main body 23 is formed with a first through hole for passage of light from the second light source 221 therethrough. The second light source 221 is the primary light emission device of the image projection portion 22 and is preferably an LED based light that exhibits advantages of high concentration of light energy, strong directionality of light emission, and saving energy and environmental friendliness. The first optical lens 222 is a convex lens mounted at an opening of the first through hole of the main body for converging and guiding light from the second light source 221 onto the site where the projection holes of the projection gear 225 are located. The first retention member 227 is mounted on the first optical lens 222 and has a central portion formed with a second through hole for the passage of light and is fixed, via bolts or screws, to the main body 23 and also fixes the first optical lens 222 to the opening of the first through hole. The projection gear 225 is mounted to the main body 23 between the first optical lens 222 and the second optical lens 224 and the projection gear 225 is rotatable and is detachably coupled to the main body 23 so that the rotation of the projection gear 225 makes images projected from the image projection portion 22 change. The light guide tube 229 is arranged above the projection gear 225 for guiding light and supporting the second optical lens 224 and is fixed, via bolts or screws, to the main body 23 but is not in contact engagement with the projection gear 225 and has a central portion formed with a third through hole for the passage of light. The third through hole has a length that is determined according to distances between the second light source 221, the first optical lens 222, and the second optical lens 224 and optics theories. The second optical lens 224 is a concave lens mounted above the third through hole for spreading and projecting light transmitting through the projection holes to an outside space. The second retention member 228 is arranged on the second optical lens 224 and is coupled, via bolts or screws, to the light guide tube 229 and also fixes the second optical lens 224 at an upper opening of the third through hole and has a central portion formed with a fourth through hole for passage of light. The back cover 226 is fit outside the image projection portion 22 to cover and shield inside structures and also block external light and has a central portion formed with a fifth through hole for passage of light. The back cover 226 is coupled, via a spring, to the second retention member 228 and demonstrate elasticity to allow for removal in backward direction and also for automatic position restoration after the back cover 226 is released.

Figure 4:
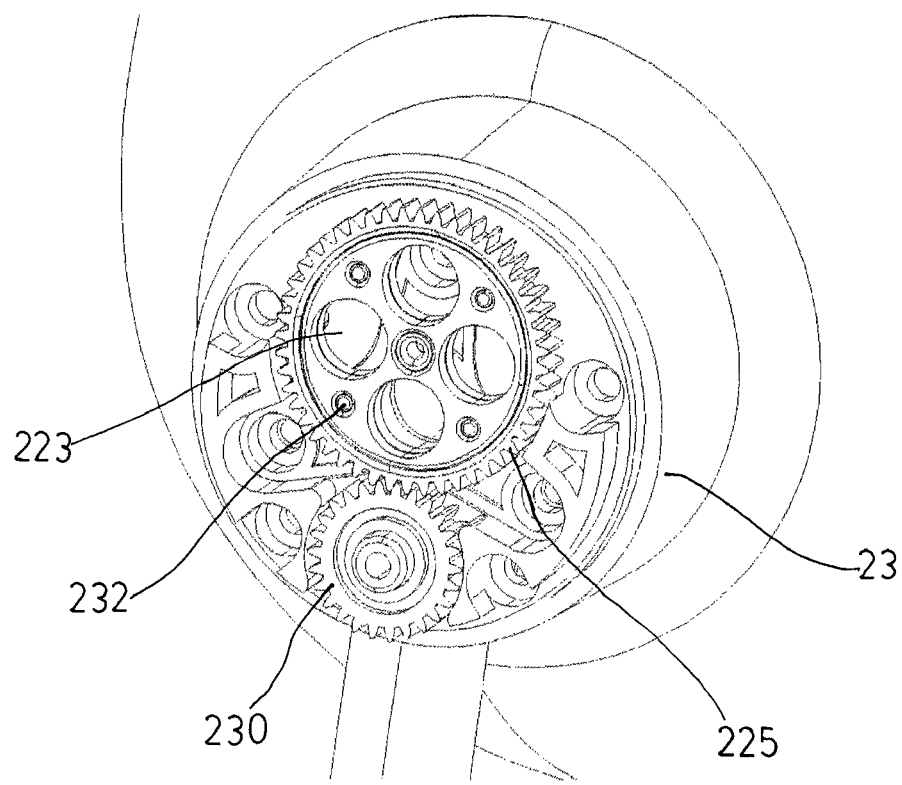
FIG. 4 is a schematic view illustrating a projection gear of the present invention.
Figure 5:
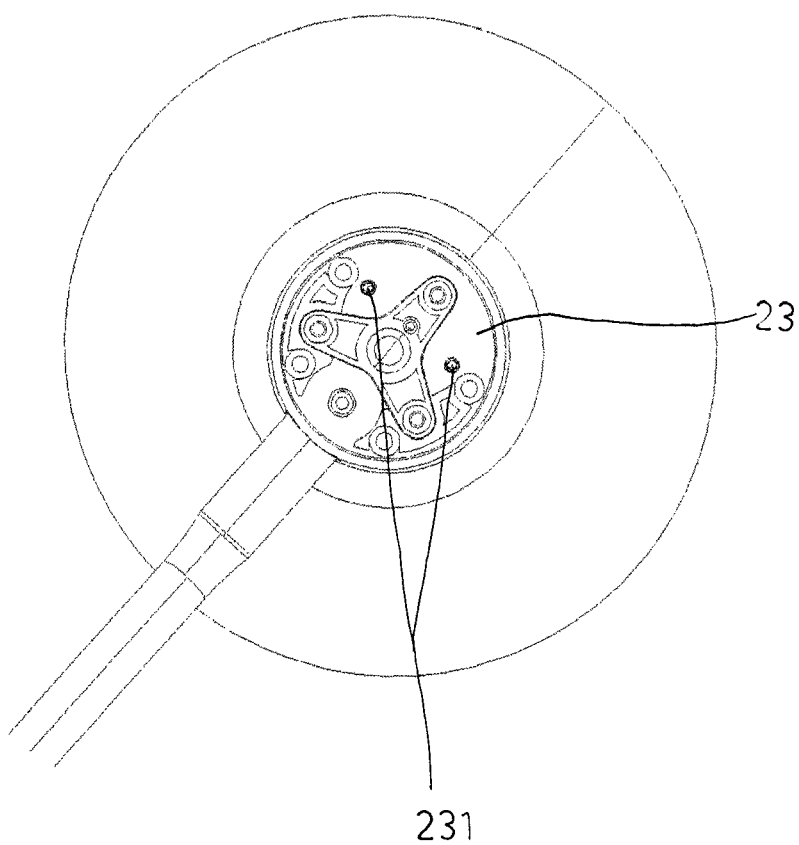
FIG. 5 is a schematic view illustrating positioning pegs of the present invention.

Specifically, as shown in FIG. 4, in the instant embodiment, the projection gear 225 has a circumferential portion that is provided, partly with teeth and partly projects beyond and outside a side surface of the main body 23 so that in a completely assembled condition of the desk lamp, the projecting part of the projection gear 225 is accessible and operated by a user's hand for rotation to achieve change of projected images, without the need to disassemble certain parts. In the instant embodiment, the projection gear 225 is provided with four projection holes that are distributed in a circumferential direction in an equally spaced manner and the projection holes are respectively installed therein with projection sheets 223 that carry different images to be projected. Through rotation of the projection gear 225, different ones of the projection sheets 223 are driven and brought into the optical path to achieve change of the image projected by the image projection portion 22. In the instant embodiment, a positioning wheel 230 is further included for mating and operating in combination with the projection gear 225. The positioning wheel 230 has a circumferential edge that mate and engage the circumferential edge of the projection gear 225 for rotating and positioning the projection gear 225 with better accuracy. As shown in FIG. 4, the projection gear 225 is also provided thereon with positioning spots 232. As shown in FIG. 5, the main body 23 is provided with positioning pegs 231 corresponding to the positioning spot 232. In the instant embodiment, the positioning spots 232 are made in the form of recessed dimples that are distributed, in an equally spaced manner in the circumferential direction, at four directions on the projection gear 225. Also, the main body 23 is provided, at locations thereon corresponding to the site where the projection gear 225 is arranged, with two positioning pegs 231. The positioning pegs 231 are coupled to spring and are normally projecting upward and outward so that when the positioning spots 232 pass over the positioning pegs 231, the upward projection of the positioning pegs 231 causes engagement thereof with and moving into the dimples of the positioning spots 232 in order to provide an effect of positioning of the projection gear 225. It is noted that when the positioning spots 232 of the projection gear 225 are brought into engagement with the positioning pegs 231, one of the projection holes of the projection gear 225 and the projection sheet 223 thereof are located exactly in the optical path of the image projection portion 22, allowing the image projected from the image projection portion 22 to be held in a stable condition thereby preventing influence on visual perception resulting from the shaking of the image.

In the instant embodiment, the process of formation of the projected image with the image projection portion 22 is as follows. Light emits from the second light source 221 and the first optical lens 222 condenses the light on the projection sheets 223 mounted in the projection holes. The second optical lens 224 magnifies and projects the images of the projection sheets 223 onto a ceiling or a wall.

To use the instant embodiment, the second switch 12 is turned on to activate the function of image projection. Adjustment is made on the curving or flexing of the light support 3 to provide an optimum angle for projection of image. The projection gear 225 is selectively rotated to change the image projected. Since the projection gear 225 is removable, in the instant embodiment, a number of projection gears 225 comprising projection sheets 223 covering different styles or fashions so that when a different set of projection sheets 223 is needed, the back cover 226 is pulled backward for removal and the projection gear 225 located inside the desk lamp can be removed for replacement. After the replacement, the back cover 226 is released and would automatically return to the original position. When regular lighting is required, the first switch 11 is turned on to control the illuminator portion 21 to operate in one of the three lighting modes of mediate lighting, high lighting, and shut down.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multifunctional desk lamp, comprising a base, a lighting body, and a light support connected to the base and the lighting body, wherein the lighting body has an integral structure and comprises an illuminator portion for illumination and an image projection portion for projection of images;
   wherein the image projection portion comprises a rotatable projection gear, such that the rotation of the projection gear changes images projected from the image projection portion, and the image projection portion comprises, in sequence from inside to outside, a second light source, a first optical lens for converging light, and a second optical lens for dispersing light, the projection gear being mounted between the first optical lens and the second optical lens.

2. The multifunctional desk lamp according to claim 1, wherein the projection gear is formed with a plurality of projection holes in which projection sheets are mounted and an optical path extending from the second light source through, in sequence, the first optical lens, the projection holes, and the second optical lens to an outside space is defined so that the rotation of the projection gear moves the projection holes and the projection sheets thereof to alternately into the optical path to achieve change of the images projected from the image projection portion.

3. The multifunctional desk lamp according to claim 1, wherein the image projection portion also comprises a first retention member that retains the first optical lens, a second retention member that retains the second optical lens, and a light guide tube for guiding light and supporting the second optical lens.

4. The multifunctional desk lamp according to claim 3, wherein the image projection portion further comprises a back cover, the back cover being connected, via a spring, to the second retention member.

5. The multifunctional desk lamp according to claim 3, wherein the main body comprises positioning pegs and the projection gear comprises positioning spots formed therein to operate in combination with the positioning pegs; and the projection gear and the main body are detachable.

6. The multifunctional desk lamp according to claim 1, wherein the lighting body also comprises a main body, and the illuminator portion and the image projection portion are mounted on the main body.

7. The multifunctional desk lamp according to claim 1, wherein the base comprises a storage battery that functions as a power supply; and the base is provided thereon with a first switch for controlling a lighting mode of the illuminator portion and a second switch for controlling an activation state of the image projection portion.

8. The multifunctional desk lamp according to claim 1, wherein the light support comprises a flexible tube that is bendable.

\* \* \* \* \*